United States Patent [19]

Laskaris

[11] 3,991,333

[45] Nov. 9, 1976

[54] WINDING SUPPORT STRUCTURE FOR SUPERCONDUCTING ROTOR

[75] Inventor: Evangelos T. Laskaris, Schenectady, N.Y.

[73] Assignee: General Electric Company, Schenectady, N.Y.

[22] Filed: Aug. 20, 1975

[21] Appl. No.: 606,177

[52] U.S. Cl. .................................. 310/52; 310/198; 310/261
[51] Int. Cl.² ........................................ H02K 9/00
[58] Field of Search .................. 310/10, 40, 52, 54, 310/42, 165, 200–208, 198, 195, 264, 261, 265, 262, 209; 336/55–62

[56] References Cited
UNITED STATES PATENTS

| 3,097,317 | 7/1963 | Fechheimer | 310/61 |
| 3,242,418 | 3/1966 | Mela | 310/40 |
| 3,517,231 | 6/1970 | Massar | 310/52 |
| 3,816,780 | 6/1974 | Smith | 310/40 |
| 3,891,875 | 6/1975 | Laskaris | 310/40 |

OTHER PUBLICATIONS

Ohno et al.; "Proceedings of 5th Int. Cryogenic Eng. Conference"; IPC Sc. & Techn. Press; London, England; 1974.

Primary Examiner—R. Skudy
Attorney, Agent, or Firm—Marvin Snyder; Joseph T. Cohen; Jerome C. Squillaro

[57] ABSTRACT

Rigid support for the rotor winding of a superconductive A.C. generator is achieved by combining a plurality of modular racetrack-shaped sections to form the winding. Each section is separately supported to withstand the centrifugal forces and load forces on the winding during operation. The windings and support members are machined in close tolerance, and the support member material is selected so that differential thermal contraction during cooldown results in an interference fit and compression at the winding-support interface.

10 Claims, 8 Drawing Figures

WINDING SUPPORT STRUCTURE FOR SUPERCONDUCTING ROTOR

INTRODUCTION

This invention relates to electrical machines employing superconducting rotors, and more particularly to apparatus for rigidly supporting the rotor windings of a superconductive machine so as to prevent the windings from inadvertently going normal due to friction heating.

Rotor windings of a superconducting generator, being comprised of superconductors, exhibit essentially zero resistance when cooled to their superconducting state. To cool the windings to the necessary low temperature, they are bathed in a pool of very cold, liquefied gas, e.g., liquid helium which boils at 4.2° K.

Recent development of intrinsically stable niobium-titanium superconductors has permitted considerable improvement in design and construction of superconducting coils of the type useful in the rotor of a superconducting machine. These superconductors comprise a number of twisted filaments of niobium-titanium embedded in a copper matrix. Typically, the individual filament diameter is less than 0.001 inch and the copper/superconductor ratio in the composite conductor may be on the order of 1.5/1.

Superconductors, however, including those fabricated of niobium-titanium, exhibit lower transition currents when wound into a coil, because of what is known as the degradation effect. For example, a typical superconductor may carry 40 amperes in a magnetic field of 4 Tesla when tested in a short length configuration; nevertheless, the same superconductor may carry less than 20 amperes when wound in a coil that produces 4 Tesla. This decrease in superconductor current-carrying capability is due to relative motion between superconducting wires and between the coil windings and their support means. Despite epoxy impregnation of the superconducting windings to prevent motion between wires, magnetic and centrifugal forces on the windings are sufficiently high to have caused relative motion between the windings and their support means in the past. Frictional heating due to motion of the wires raises the superconductor temperature locally above the critical temperature, causing the superconductor to revert to its normal state. Since specific heat of the coil material at 4.2° K is very low, only small amounts of frictional heat are required to produce a significant superconductor temperature rise.

It had been believed that impregnation of the coil with an epoxy resin would preclude wire movement, but in practice this procedure has been less than satisfactory due to the difficulty in achieving void-free impregnation. Voids tend to initiate cracks within the coil, resulting in poor coil performance. Moreover, epoxy-impregnated coils operating at 4.2° K often exhibit a tendency to crack due to differential thermal contraction, thus adversely affecting coil performance. Although recently-developed impregnation techniques appear to have reduced these difficulties, it would be desirable to augment the epoxy impregnation in a way that reliably insures against movement of the coil. The present invention concerns such augmentation.

Accordingly, one object of the invention is to provide rigid support for the windings of a superconducting rotor.

Another object is to provide a machine including a superconducting rotor exhibiting negligible frictional heating during operation of the machine.

Another object is to provide a machine including a superconducting rotor having reduced tendency for epoxy resin coil impregnation to crack due to differential thermal contraction.

Briefly, in accordance with a preferred embodiment of the invention, a superconductive rotor winding assembly comprises a plurality of relatively thick rectangular housings, each housing having a racetrack-shaped opening therein to accommodate therein, at close tolerance, a respective one of the windings. Tapered corners are provided along each longitudinal edge of the housing. A plurality of racetrack-shaped windings are provided, along with a plurality of relatively thin plates, each plate being situated between successive ones of the housings, respectively, such that the housings and plates form a stack. Each of the plates has wedge-shaped longitudinal edges to mate with the tapered corners of the adjacent housings. Support means are provided at either end of the stack, and compressive force is exerted on each of the support means by means passing through the interior of the stack in a direction orthogonal to the planes of the windings, thereby maintaining the stack under compressive stress. The stack is encircled about its longitudinal axis by retainer means rigidly affixed thereto at least near the central portion of the longitudinal axis. The housing and winding materials are selected such that thermal contraction of each housing exceeds thermal contraction of each winding contained therein, respectively, when the entire stack is cooled from room temperature down to cryogenic temperature. This results in an interference fit and compression at each winding-plate and winding-support means interface.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
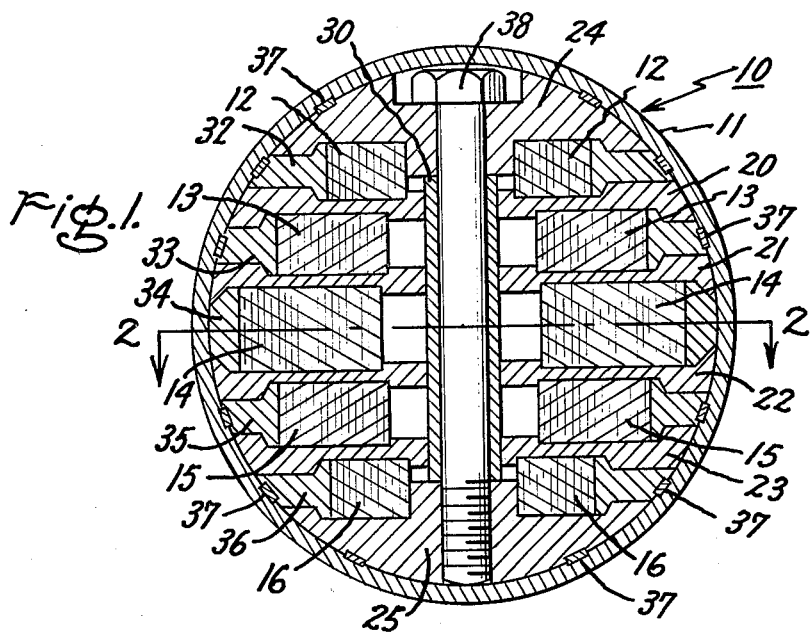
FIG. 1 is a radial cross-sectional view of a rotor constructed in accordance with the teachings of the invention.

In FIG. 1, a superconducting A.C. generator rotor 10 is illustrated as comprising a hollow torque tube 11 acting as a retainer ring and containing a plurality of flat racetrack windings 12–16 arranged, in modular fashion, in a stack, the adjacent windings being separated from each other by support plates 20–23, respectively. Magnetic pole or support segments 24 and 25 are situated at the top and bottom, respectively, of the winding stack. Each of windings 12–16 fits at close tolerance within, so as to be encircled by, a housing 32–36, respectively. The entire stack of windings, support plates, and support segments, is compressed by the action of a plurality of cross bolts, such as bolt 38, disposed along the longitudinal axis of the rotor and passing through the entire stack, from one support segment to the other, in a direction orthogonal to the parallel planes of the racetrack windings. Each of bolts 38 is encircled by a sleeve 30 which prevents loosening of the bolts when the component of magnetic forces perpendicular to the rotor magnetic pole axis tends to cause elliptical deformation of the torque tube and thereby compress the stack. The rotor magnetic pole axis coincides with a plane defined by the longitudinal axes of the bolts. Magnetic and centrifugal force components along the magnetic pole axis are carried by the bolts and the torque tube.

Figure 2:
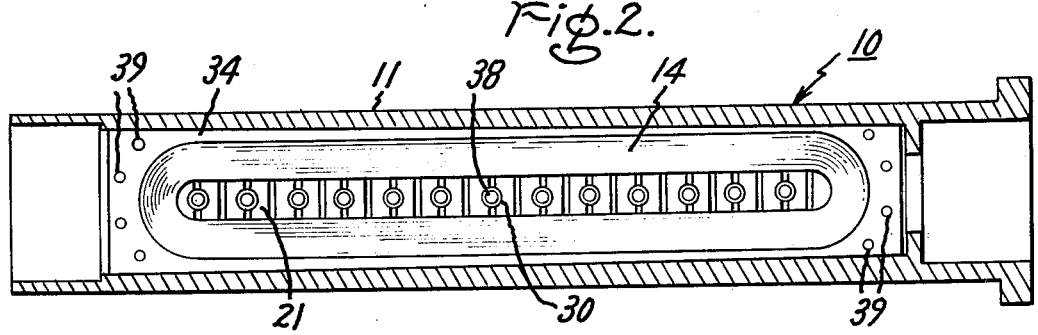
FIG. 2 is a longitudinal cross-sectional view of the rotor of FIG. 1 taken along line 2—2 thereof.

Pole segments or support sectors 24 and 25, along with the outermost housings 32, 33, 35 and 36, are keyed to torque tube 11 through keys 37. The entire stack of windings, support plates, and support segments forms a conical fit within torque tube 11, substantially over the entire length of the stack, ensuring that the entire stack rotates in unison with the torque tube. This is illustrated in FIG. 2, which is a longitudinal sectional view of the rotor along line 2—2, and shows the conical fit between housing 34 and torque tube 11 in plan view. Openings 39 in housing 34, when assembled in a rotor, hold dowels therein, as described in greater detail in conjunction with the apparatus of FIGS. 4A and 5A, infra. The torque tube transmits torsional force from the power shaft to the rotor windings, and restrains the winding assembly against the action of high centrifugal forces during rotor rotation.

Machine tolerances between the windings and their respective housings are determined such that, during cooldown to cryogenic temperatures, differential thermal contraction between each winding and its respective housing takes up assembly tolerances and subjects the winding to compression. To prevent buckling of the windings due to high compression forces at 4.2° K, axial tolerances are made larger than transverse tolerances. The support plates are stressed in tension transversely (i.e., within the plane of the winding orthogonal to the plane of the rotor cross bolt longitudinal axes) due to the magnetic and centrifugal force components acting in that direction.

In the structure of FIG. 1, the windings are machined in close tolerance to the support plates and winding housings, and a very thin sheet of insulation (not shown for simplicity of illustration) such as Mylar, a trademark of E. I. du Pont de Nemours and Company, Wilmington, Del., is inserted between each winding and its adjacent support plates (and support sectors where applicable) and winding housing, to provide electrical insulation for the windings.

Power output capability of a superconductive generator increases as flux density in the nonsuperconductive stator winding region (produced by the rotor winding) increases. However, only the fundamental or dipolar component of this field is useful in producing output power in a two-pole generator; that is, the radial component of the fundamental flux density wave produced by rotor winding current is sinusoidally distributed in the stator winding region, and additional harmonics in the rotor flux density wave produce unwanted harmonics in the output voltage. This makes it desirable to use a rotor winding geometry that produces, in the stator winding region, a flux density distribution having a large fundamental component and small harmonic content.

The rotor winding geometry is designed such that maximum flux density experienced by the superconducting windings thereof is as low as possible, consistent with maximizing the fundamental component of flux density in the stator winding region. This is necessary because of the well-known flux density dependence of current carried by superconducting windings. The resulting simple rotor winding geometry facilitates winding impregnation and mechanical support.

Figure 3A:
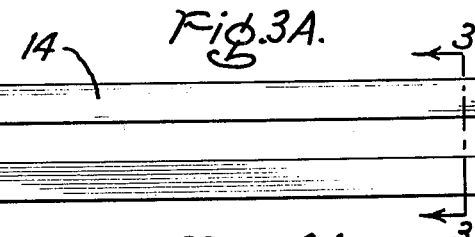
FIG. 3A is a plan view of a racetrack winding employed in the rotor of FIG. 1.
Figure 3B:
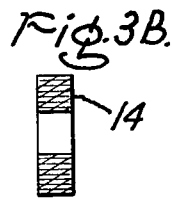
FIG. 3B is a sectional view of the winding of FIG. 3A taken along line 3—3 thereof.

FIG. 3A illustrates the racetrack configuration of a typical winding, such as winding 14, for example. The windings are dimensioned and assembled to minimize magnetic field harmonics produced by the rotor which, in turn, maximizes power generated at the fundamental frequency with respect to power generated at harmonic frequencies. Each racetrack winding or module is fabricated of filamentary niobium-titanium superconductor embedded in a copper matrix, reinforced with interlayer insulation of glass cloth, and impregnated with epoxy resin to provide a strong, rigid winding structure. A schematic sectional view of winding 14 along line 3—3 of FIG. 3A is illustrated in FIG. 3B.

By employing twisted filament conductors in the racetrack windings, stabilization against local flux motion or so-called "flux jumps" is achieved in a manner well-known in the art. These "flux jumps", which may be generated spontaneously by thermal activation, by an external stimulus such as an abrupt change in current, or by mechanical shock, produce a local temperature rise which may cause the superconductor to exceed its critical temperature and go normal. To stabilize against "flux jumps", the superconductor (niobium-titanium) is codrawn in copper to produce a composite matrix that has thousands of small filaments of superconductor, separated by the matrix. The individual superconducting filament diameter is smaller than the critical size for "flux jumps", and the twist pitch is made sufficiently short to prevent initiation of "flux jumps" induced by circulating currents between the filaments. This is a well-known technique.

If the twisted filament conductors have a relatively small copper-to-superconductor ratio, such as on the order of 1.5:1 or lower, another form of instability, attributable to local frictional heating caused by mechanical motion or slip of the conductors while the winding is energized, exists. Remedy for this instability is impregnation of the winding with an epoxy resin; however, to be completely effective, it is important that the impregnated winding be void-free.

Figure 4A:
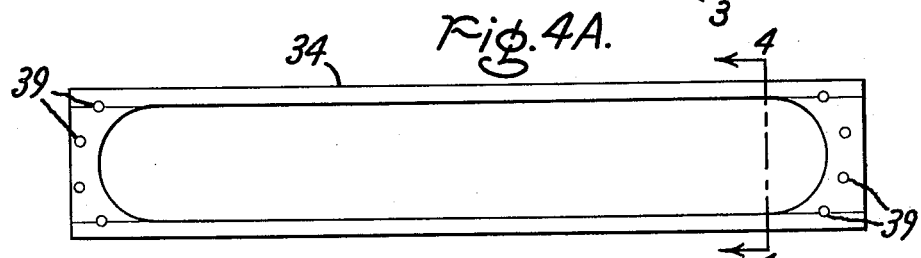
FIG. 4A is a plan view of a housing for the racetrack winding of FIGS. 3A and 3B.
Figure 4B:
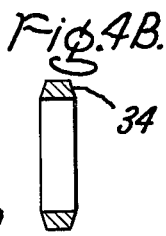
FIG. 4B is a sectional view of the housing of FIG. 4A taken along line 4—4 thereof.

FIG. 4A illustrates a typical housing 34 for containing a racetrack winding therein. Alignment holes 39 for receiving dowels are situated at either end of the housing. Each housing is machined from a rectangular aluminum plate to fit about a racetrack winding in close tolerance. The winding is machined near its longitudinal edges to form tapered corners, as illustrated in FIG. 4B.

Figure 5A:
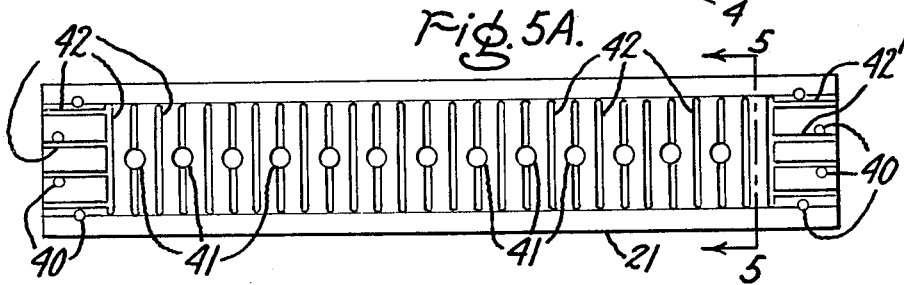
FIG. 5A is a plan view of a support plate for the racetrack winding of FIGS. 3A and 3B.
Figure 5B:
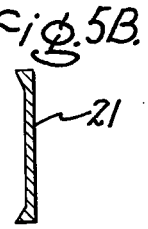
FIG. 5B is sectional view of the support plate of FIG. 5A taken along line 5—5 thereof.

FIG. 5A illustrates a typical support plate 21 for insertion between successive assemblies of racetrack windings with their respective housings. Alignment holes 40 for receiving the dowels passed through the adjacent housing are situated at either end of the support plate. Holes 41, spaced longitudinally along the support plate, permit passage of cross bolts therethrough, such as bolt 38 shown in FIG. 1. The support plate further contains channels therein through which liquefied coolant may circulate so as to maintain the windings at cryogenic temperatures. On each side of support plate 21, a series of transverse and axial grooves 42 is machined to provide for cross flow cooling of the straight winding conductors and axial flow cooling of the curved winding conductors. As illustrated in FIG. 5B, the longitudinal edges of the support plate are machined to form wedges in order to fit properly the tapered corners of the adjacent housing in the assembly of FIG. 1.

Each support plate comprises high strength aluminum and exhibits an interference fit and compression at coil-support plate interface when the assembly is cooled down to cryogenic temperatures. Linear thermal contraction of the winding (which is nearly identical to that of copper) for a temperature differential of 300° K is $\Delta L/L = 0.00339$, and thermal contraction of the aluminum support plate for a temperature change of 300° K is $\Delta L/L = 0.00431$. This yields, over any common distance L, an interference fit at 4.2° K of about $(\Delta L_{winding} - \Delta L_{plate})/L = -0.00102$.

The foregoing describes a machine including a superconducting rotor exhibiting essentially zero frictional heating during operation of the machine as a result of rigid support provided for the rotor windings. The rotor exhibits a reduced tendency for epoxy resin coil impregnation to crack due to differential thermal contraction.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A superconductive rotor winding assembly comprising:
   a plurality of racetrack-shaped windings;
   a plurality of relatively thick rectangular housings, each housing having a racetrack-shaped opening therein to accommodate therein, at close tolerance, a respective one of said windings;
   a plurality of relatively thin plates, each plate being situated between successive ones of said housings, respectively, such that said housings and plates form a stack;
   support means at either end of said stack;
   means passing through the interior of said stack in a direction orthogonal to the planes of said windings and exerting compressive force on each of said support means so as to maintain said stack under compressive stress; and
   retainer means encircling said stack about the longitudinal axis of said stack, said retainer means being rigidly affixed to said stack at least near the central portion of said longitudinal axis,
   the material of said housings and said windings being selected such that thermal contraction of each of said housings exceeds thermal contraction of each of the windings contained therein, respectively, when said stack is cooled to cryogenic temperature so as to produce an interference fit and compression at each winding-plate and winding-support means interface.

2. The apparatus of claim 1 wherein each of said housings includes tapered corners along each longitudinal edge and each of said plates includes wedge-shaped longitudinal edges to mate with the tapered corners of the adjacent housings, respectively.

3. The apparatus of claim 1 wherein said housings are comprised of aluminum, said plates are comprised of aluminum, and said windings are comprised of filamentary superconductive material embedded in a copper matrix.

4. The apparatus of claim 3 wherein said superconductive material comprises niobium-titanium.

5. The apparatus of claim 3 wherein each of said housings includes tapered corners along each longitudinal edge and each of said plates includes wedge-shaped longitudinal edges to mate with the tapered corners of the adjacent housings, respectively.

6. The apparatus of claim 5 wherein said superconductive material comprises niobium-titanium.

7. The apparatus of claim 1 wherein each of said plates includes channel means formed therein to facilitate circulation of liquefied coolant about said racetrack windings.

8. The apparatus of claim 7 wherein each of said housings includes tapered corners along each longitudinal edge and each of said plates includes wedge-shaped longitudinal edges to mate with the tapered corners of the adjacent housings, respectively.

9. The apparatus of claim 1 wherein said retainer means is affixed to said stack by conical fit over substantially the entire length of said stack.

10. The apparatus of claim 8 wherein said retainer means is affixed to said stack by conical fit over substantially the entire length of said stack.

\* \* \* \* \*